(No Model.) 6 Sheets—Sheet 1.

L. H. GODDU.
MACHINE FOR INSERTING SCREW THREADED WIRE.

No. 583,045. Patented May 25, 1897.

Witnesses:
John F. C. President
J. Murphy.

Inventor:
Louis H. Goddu
by Jas. H. Churchill
atty.

(No Model.) 6 Sheets—Sheet 2.
L. H. GODDU.
MACHINE FOR INSERTING SCREW THREADED WIRE.
No. 583,045. Patented May 25, 1897.

(No Model.) 6 Sheets—Sheet 4.
L. H. GODDU.
MACHINE FOR INSERTING SCREW THREADED WIRE.
No. 583,045. Patented May 25, 1897.

Witnesses
John F. C. Prescott
J. Murphy

Inventor
Louis H. Goddu
By Jas. H. Churchill
Atty.

(No Model.) 6 Sheets—Sheet 5.

L. H. GODDU.
MACHINE FOR INSERTING SCREW THREADED WIRE.

No. 583,045. Patented May 25, 1897.

(No Model.) 6 Sheets—Sheet 6.
L. H. GODDU.
MACHINE FOR INSERTING SCREW THREADED WIRE.

No. 583,045. Patented May 25, 1897.

Witnesses:
John F. C. Prainhot
J. Murphy

Inventor:
Louis H. Goddu
by Jas. H. Churchill
atty.

UNITED STATES PATENT OFFICE.

LOUIS H. GODDU, OF WINCHESTER, MASSACHUSETTS.

MACHINE FOR INSERTING SCREW-THREADED WIRE.

SPECIFICATION forming part of Letters Patent No. 583,045, dated May 25, 1897.

Application filed May 20, 1896. Serial No. 592,269. (No model.)

*To all whom it may concern:*

Be it known that I, LOUIS H. GODDU, residing in Winchester, county of Middlesex, and State of Massachusetts, have invented an Improvement in Machines for Inserting Screw-Threaded Wire, of which the following description, in connection with the accompanying drawings, is a specification, like letters and figures on the drawings representing like parts.

This invention relates to a machine for inserting screws formed from a continuous screw-thread wire into the soles of boots and shoes for the purpose of uniting the outer sole to the upper and inner sole, and has for its object to provide an efficient machine of improved construction, as will be described, whereby simplicity, durability, and accessibility of parts and perfection of operation may be obtained at a minimum cost.

In accordance with this invention the wire to be inserted into the stock, and which is previously screw-threaded, is fed or inserted into the material or work through a revolving spindle by a feed mechanism of novel construction, as will be described, with which coöperates a novel measuring device or apparatus automatically controlled by the thickness of the work, as will be described, to regulate the length of wire screwed into the material or work.

The measuring device or apparatus is connected to a work-support or horn and has coöperating with it a device by which the distance the work-support or horn is lowered from the wire-carrying spindle may be controlled or regulated as desired.

The portion of the wire inserted into the work is severed from the remaining portion of the continuous wire by suitable knives or cutters secured to carriers located in substantially the same horizontal plane and mounted on separate pivots, whereby torsional or twisting action on the cutter-carriers while in operation is avoided, and the said carriers are of novel construction and are operated in a novel manner, as will be described, whereby increased efficiency may be obtained.

The work-support or horn is of a novel construction, as will be described, and is upwardly spring-pressed in a novel manner, as will be described, and the said horn is connected to its operating parts in a novel manner, which permits of a rotary movement of the horn and its shaft and which also controls the vertical motion of the said shaft.

The machine is further provided with a novel construction of feed mechanism for the work.

These and other features of this invention will be pointed out in the claims at the end of this specification.

Figure 1 is a side elevation of the upper portion of a machine embodying this invention; Fig. 1ª, a detail to be referred to; Fig. 2, a side elevation, with parts broken away, of the lower portion of the machine, which figure is to be read in connection with Fig. 1; Fig. 2ª, a detail to be referred to; Fig. 4, a longitudinal section, on an enlarged scale, through the wire-carrying spindle, the section being taken on the line 4 4, Fig. 1; Fig. 5, a sectional detail, on an enlarged scale, through the lower portion of the wire-carrying spindle and its head, the section being taken on the line 5 5, Fig. 6; Fig. 6, a sectional detail through the spindle-head on the line 6 6, Fig. 5; Fig. 7, a sectional detail through the spindle-head on the line 7 7, Fig. 5; Fig. 8, a sectional detail, on an enlarged scale, through the wire-carrying spindle on the line 8 8, Fig. 4, and looking upward; Fig. 9, a sectional detail, on an enlarged scale, on the line 9 9, Fig. 1, looking down, to more clearly show the cutter-carriers; Fig. 10, a detail in elevation to be referred to; Fig. 11, a vertical section of the machine shown in Fig. 3 on the line 11; Figs. 12 and 13, sectional details of the work-feeding mechanism to be referred to; Fig. 15, a detail in elevation to be referred to.

Figures 1, 1A:
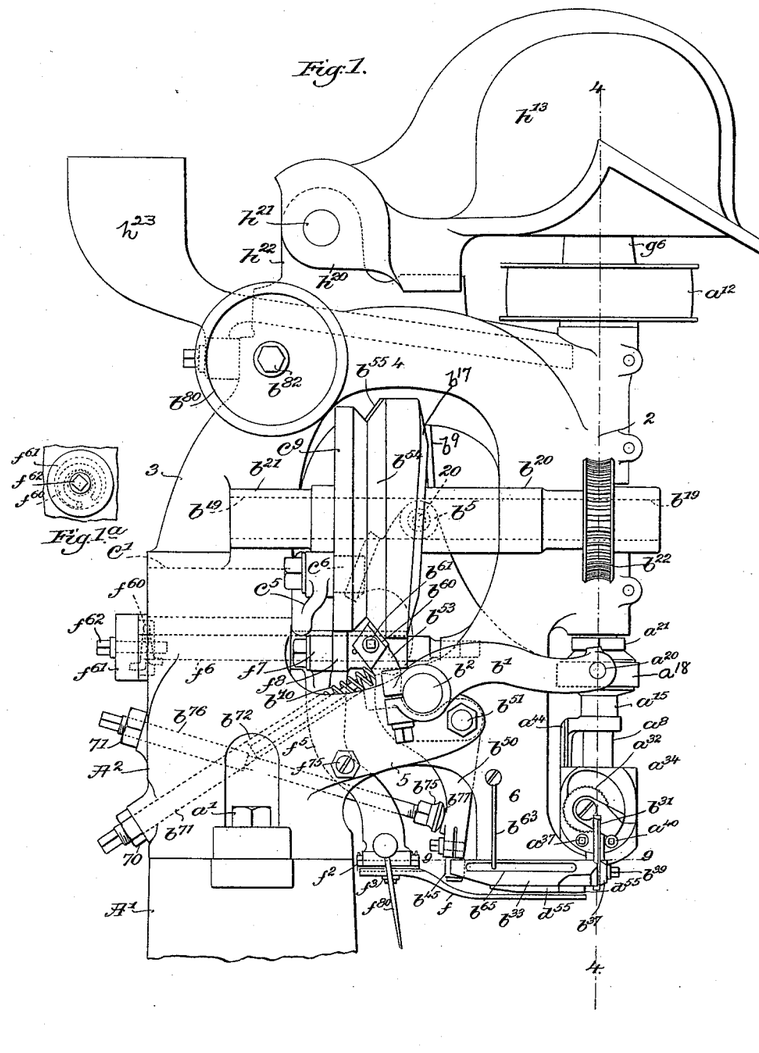

The main or supporting framework of the machine may be of any suitable or desired construction and, as herein shown, comprises, essentially, a hollow or open base portion A, provided with feet *a*, adapted to be bolted or otherwise firmly fastened to the floor or other foundation, an upright or standard A', preferably integral with the said base, and a head A², preferably of the construction shown in Fig. 1 and firmly secured to the standard or upright A', as by bolts or screws $a'$.

The head A² may and preferably will be made of the construction herein shown and consists, essentially, of an open framework composed of the front and rear sides 2 3, top 4, cross-bars 5, connecting the sides 2 3 on opposite sides of the head, and arms 6, depending from and forming part of the sides 2 3 below the cross-bars 5. The side 2 of the head has extended through it and supported in suitable bearings, as will be described, a hollow wire-carrying spindle $a^4$, (see Figs. 1 and 4,) which may be of any suitable or desired construction, such as now commonly found in machines of this class and which in the present instance is extended through a bearing-sleeve within the side 2 of the head and composed of two parts $a^5$ $a^6$, between which the hollow spindle $a^4$ has fastened on it a sleeve provided with a worm $a^7$, the said worm-sleeve being shown in Fig. 4 as screw-threaded on its interior to engage screw-threads on the spindle $a^4$.

The spindle $a^4$, at its lower end below the side 2 of the head, is provided with a socket into which is extended a stem $a^8$ on a head $a^9$ for the said spindle, the said stem being secured in its socket to attach the head $a^9$ to the said spindle, preferably as herein shown, by screw-threads on the end of the stem engaging screw-threads within the socket in the spindle, as clearly shown in Fig. 4. The spindle-head $a^9$ is provided at its lower side or bottom with a nose-piece $a^{10}$, (see Fig. 5,) and the spindle $a^4$, the spindle-head $a^9$, its stem $a^8$, and the nose-piece $a^{10}$ are provided with longitudinal openings or holes in line with each other to form a continuous passage for the wire which is to be inserted into the material. The spindle $a^4$ is provided at its upper end with a pulley $a^{12}$, fast on it and supported on antifriction or roller bearings $a^{13}$, revolving on a lower bearing-plate $a^{14}$, secured to the upper surface of the side 2 of the head.

The spindle $a^4$, between the head $a^9$ and the lower end of the side 2 of the head, has loosely mounted on it a sleeve $a^{15}$, (see Figs. 4 and 5,) provided with an annular flange $a^{16}$, the upper surface of which is beveled, as herein shown, and forms a bearing-surface for antifriction-rollers $a^{17}$, upon which rests a collar $a^{18}$ of larger diameter than the said sleeve to permit of a substantially small or limited lateral movement of the collar with relation to the sleeve, the said collar being provided with diametrically opposite studs $a^{19}$ $a^{20}$, to which the actuating mechanism for the wire-feeding mechanism is connected, as will be described.

The collar $a^{18}$ is held down into contact with the rollers $a^{17}$, as herein shown, by a washer $a^{200}$ and a threaded sleeve $a^{21}$, provided with an annular flange $a^{22}$, bearing on the washer $a^{200}$, the said sleeve being herein shown as screw-threaded on its interior to engage screw-threads $a^{23}$ on the sleeve $a^{15}$. (See Figs. 4 and 5.)

The spindle-head $a^9$, as herein shown, consists of a main piece substantially oblong in shape and composed of the side walls 10 12 13 14, (see Fig. 6,) the said main piece being recessed or made hollow at its lower portion for the reception of wire-feeding rolls $a^{25}$ $a^{26}$, and a driving pinion or gear $a^{27}$ for said feed-rolls, the said pinion being loosely mounted on a stud $a^{28}$, extended through the wall 10 of the spindle-head, and secured thereto by a nut $a^{29}$, the said pinion having secured to or forming part of it a hub or sleeve $a^{30}$, upon which is loosely mounted a gear or pinion $a^{31}$, having secured to or forming part of it a ratchet-wheel $a^{32}$, having coöperating with it a pawl $a^{33}$, carried by an arm $a^{34}$, fast on the sleeve or hub $a^{30}$, and herein shown as screwed thereon and secured by the screw-nut $a^{35}$. The pawl $a^{33}$ is acted upon by a spring $a^{36}$ to hold it in engagement with the ratchet-wheel $a^{32}$.

The loose gear or pinion $a^{31}$ meshes with the feed roll or wheel $a^{25}$, having the gear-teeth integral with it and fast on a shaft $a^{37}$, (see Fig. 7,) supported in the main or solid portion of the spindle-head $a^9$.

The shaft $a^{37}$ at an intermediate point is preferably made tapering and screw-threaded to engage screw-threads on the interior circumference or bore of the geared feed-roll $a^{25}$. The feed-roll $a^{25}$ meshes with the geared feed roll or wheel $a^{26}$, which is fast on a shaft $a^{40}$ of like construction to the shaft $a^{37}$, and having bearings in a detachable cap or plate $a^{41}$, secured to the wall 13 of the spindle-head by a screw-bolt $a^{42}$, as herein shown, (see Fig. 5,) the lower portion of the cap or side piece $a^{41}$ being provided with the recess $a^{43}$ for the feed wheel or roll $a^{26}$. The feed wheels or rolls $a^{25}$ $a^{26}$ are provided with annular grooves $a^{44}$, (see Fig. 7,) which may be suitably formed with a screw-worm to engage the wire between its threads, the said grooves, where they embrace the wire, forming a part of the continuous passage through the spindle-head.

Figures 4, 5, 6, 7, 8, 9, 10:
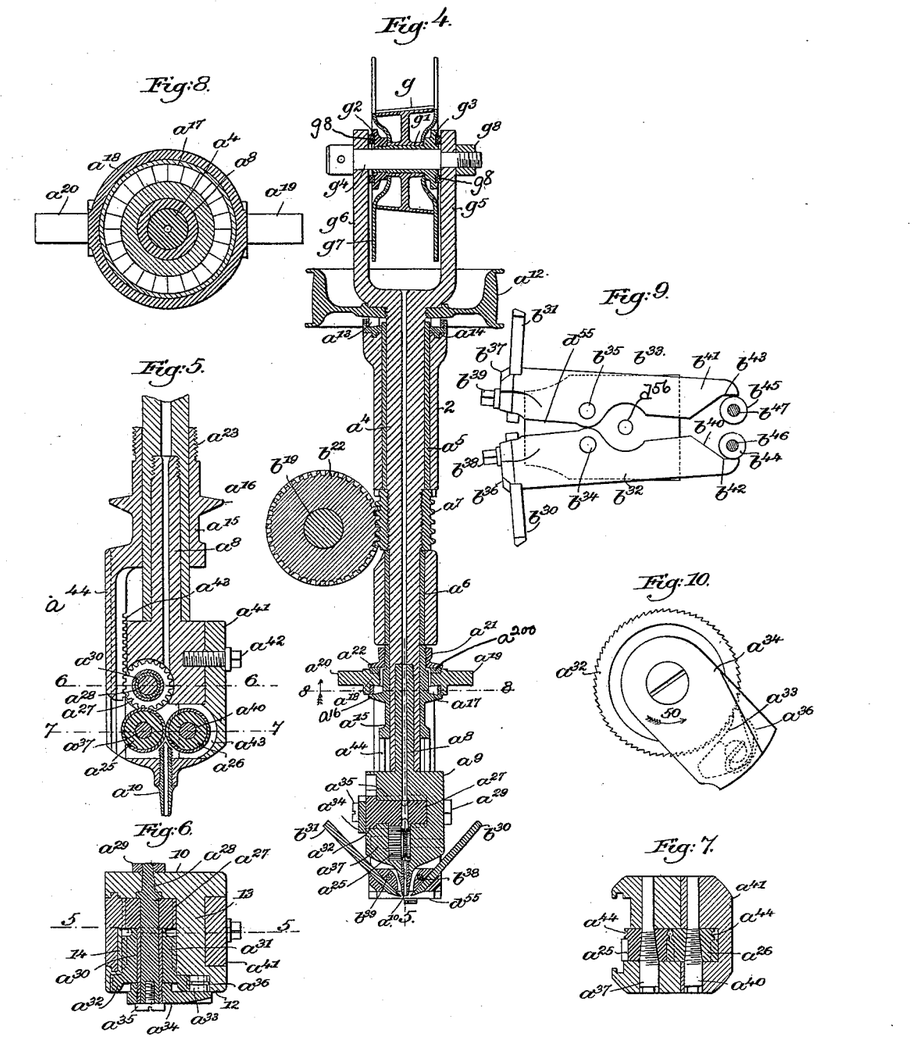

By reference to Figs. 5, 6, and 7 it will be seen that the feed-rolls, which in this instance have the gears integral with them, are fast on their shafts between the ends of the same, and the said ends are supported in solid bearings, which construction of feed mechanism is durable, simple, and of easy motion.

The pinion $a^{27}$ is actuated by a rack-bar $a^{43}$, secured to or forming part of a slide plate or bar $a^{44}$, attached to or forming part of the sleeve $a^{15}$, so that when the said sleeve is moved downward, as will be described, the rack-bar $a^{43}$ will turn the pinion $a^{27}$, which will move or revolve the ratchet-arm $a^{34}$ in the direction of the arrow 50, Fig. 10, and, by means of the pawl $a^{33}$, will turn the ratchet-wheel $a^{32}$ and the pinion $a^{31}$, which latter will turn the feed gears or wheels $a^{25}$ $a^{26}$. The slide $a^{44}$, carrying the rack-bar, is dovetailed into the wall 14 of the head $a^9$, and the said wall is provided with a longitudinal slot which permits the rack-bar to project beyond the inner face of the wall 14 and engage the pinion or gear $a^{27}$.

Figure 3:
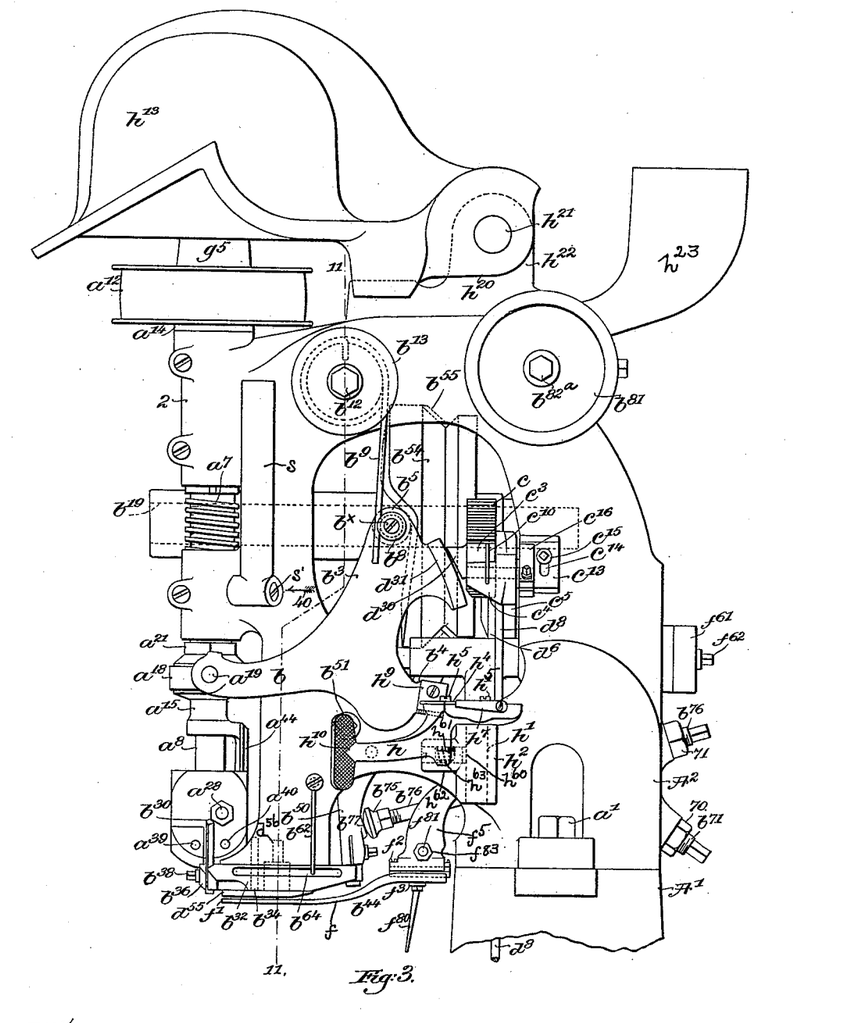
Fig. 3, a side elevation of the machine shown in Fig. 1, looking at the opposite side thereof.

The downward movement of the sleeve $a^{15}$ may and preferably will be effected by an actuating mechanism consisting of two levers or arms $b$ $b'$, (see Figs. 1 and 3,) located on opposite sides of the head $A^2$ and having their pivot-pin or shaft $b^2$ supported in bearings in the head $A^2$, the said levers having a hinge connection at their front ends with the collar $a^{18}$, which is effected, as herein shown, by providing the ends of the levers $b$ $b'$ with holes, into which extend the studs $a^{20}$ $a^{19}$, respectively. The lever $b$ is provided, as shown in Fig. 3, with an upwardly-extended arm $b^3$ and with a rearwardly-extended arm $b^4$. The arm $b^3$ of the lever $b$ carries a cam-roll $b^5$, (see Figs. 1, 3, and 11,) herein shown as mounted on a stud or pin $b^6$, secured to the arm $b^3$ by a nut $b^7$, and having loosely mounted on it, as shown, a grooved wheel or roll $b^8$, fastened onto the stud $b^6$ by a screw $b^\times$, and with which engages the free end of a spring $b^9$, shown as a wire rod having its opposite end coiled about a roll $b^{10}$, loose on a stud-bolt $b^{12}$, and provided with a collar or nut $b^{13}$, (see Fig. 11,) having a slot or opening $b^{14}$, into which the end of the coil of the spring $b^9$ is extended to secure or fasten the spring to the nut $b^{13}$, which bears against a flange $b^{15}$, projecting from one side of the head $A^2$, the said adjusting collar or nut in the present instance having a series of peripheral holes $b^{16}$, into which a suitable rod may be inserted for turning the nut to adjust the tension of the spring $b^9$.

The cam-roll $b^5$ coöperates with and is actuated by a face-cam $b^{17}$, (see Fig. 11,) which is properly shaped to effect the proper feed and insertion of the wire into the stock and to permit the spring $b^9$ to return the sleeve $a^{15}$ to its normal or proper position for effecting the feed of the wire.

The cam $b^{17}$ is fast on a shaft $b^{19}$, having bearings, as herein shown, in lugs or ears $b^{20}$ $b^{21}$ on the sides 2 3 of the head $A^2$, (see Fig. 1,) and the said shaft has fast on it a gear $b^{22}$, (see Fig. 4,) which meshes with and is driven by the worm $a^7$, fast on the spindle $a^4$. In the present instance the sleeve $a^{15}$ is moved downward by the portion of the cam $b^{17}$ between the points 20 21, Fig. 11, and as the cam revolves in the direction of the arrow 60 thereon the lever $b$ is turned and the arm $b^3$ carried forward or in the direction of the arrow 40, Fig. 3, thereby rocking the pivot-pin $b^2$, so as to move the arms $b$ $b'$, the collar $a^{18}$, and the sleeve $a^{15}$ down over the spindle $a^4$, which movement continues until the point 21 of the cam passes by the roll $b^5$, at which time the downward feed of the wire stops, and the sleeve $a^{15}$ is held stationary while the knives or cutters $b^{30}$ $b^{31}$ (see Fig. 4) are operated to sever the wire, as will be described.

When the arms $b$ $b'$ are moved downward, the collar $a^{18}$ is moved downward and also laterally on the sleeve $a^{15}$ by reason of its larger diameter than the sleeve $a^{15}$, which lateral movement is due to the arms $b$ $b'$ moving in the arc of a circle, with a pivot-pin or rock-shaft $b^2$ as a center.

The cutters or knives $b^{30}$ $b^{31}$ may be of any suitable construction and are secured to cutter-carriers $b^{32}$ $b^{33}$, (see Fig. 9,) which, in accordance with this invention, are pivotally secured to the under side of the front portion of the head $A^2$ by separate pivots $b^{34}$ $b^{35}$, so that the said carriers may be located in substantially the same horizontal plane. The cutter-carriers may be suitably shaped at their front ends to receive the cutters or knives $b^{30}$ $b^{31}$, which may be secured thereto by clamping pieces or plates $b^{36}$ $b^{37}$, fastened by the bolts or screws $b^{38}$ $b^{39}$.

Figures 11, 12, 13:
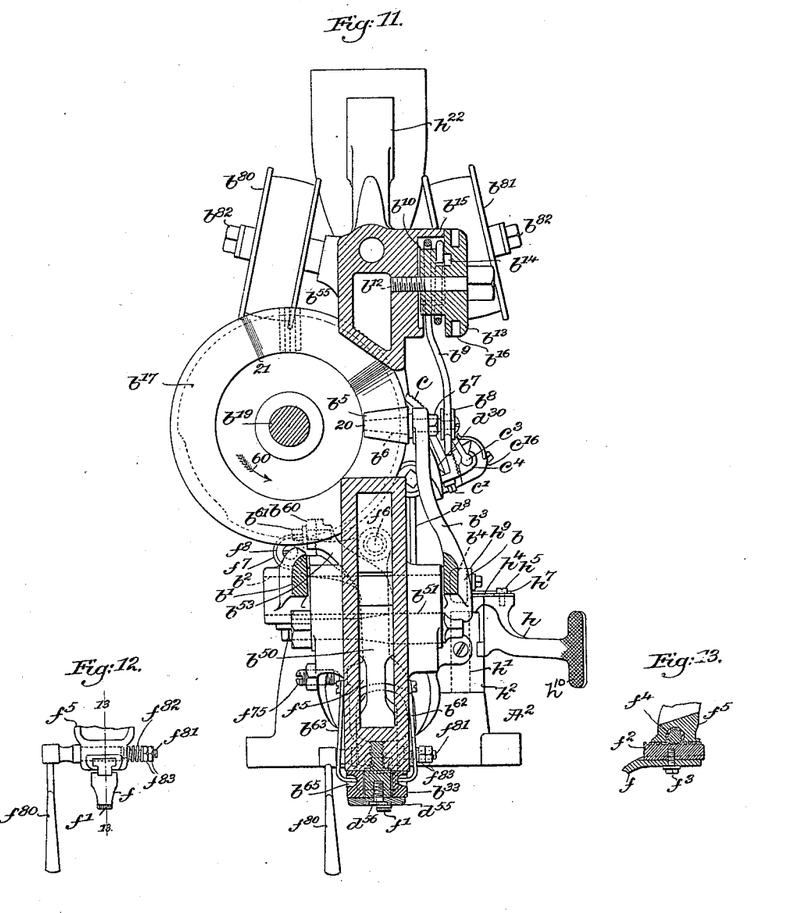

The cutter-carriers $b^{32}$ $b^{33}$ are beveled or inclined on their inner sides at their rear ends, as at $b^{40}$ $b^{41}$, and are further provided with substantially straight portions $b^{42}$ $b^{43}$, with which normally engage rollers $b^{44}$ $b^{45}$, loose on suitable studs or pins $b^{46}$ $b^{47}$, depending from the end of a lever $b^{50}$, pivotally mounted on a stud, bolt, or pin $b^{51}$, extended through the head $A^2$, the said lever having its other arm $b^{53}$ bent or extended substantially at right angles to it, as shown in Fig. 11, to bring it in line with its actuating cam-groove $b^{54}$, (see Fig. 1,) made in the periphery of a cam, preferably integral with the face-cam $b^{17}$, the said groove having on one of its faces or walls a projection $b^{55}$, preferably beveled as shown, and preferably made on a separate hardened piece, which is inserted into the cam and screwed or otherwise secured thereto. The beveled projection $b^{55}$ is adapted to engage the beveled edge or end of a hardened block or piece $b^{60}$, secured to the end of the lever-arm $b^{53}$, as herein shown, by a screw-bolt $b^{61}$ and turn the lever $b^{50}$ on its pivot $b^{51}$, and thereby cause the rollers $b^{44}$ $b^{45}$ to travel forward against the inclined or beveled faces or portions $b^{40}$ $b^{41}$ of the knife or cutter carriers, thereby bringing the cutting edges of the knives sharply and firmly against the wire and severing the portion inserted into the stock from the continuous wire. The knives are separated instantly after doing their work by springs $b^{62}$ $b^{63}$, fastened to the arms 6 of the head $A^2$ and having their lower ends engaging the said carriers and in the present instance extended into grooves, slots, or channels $b^{64}$ $b^{65}$ in the said cutter-carriers. The lever $b^{50}$ is returned to its normal position by a spring $b^{70}$, (see Fig. 1,) encircling a rod or bolt $b^{71}$, extended through the lower portion of the head $A^2$ and interposed between the lever-arm $b^{53}$ and a shoulder $b^{72}$ on the said rod, the said bolt being adjustable by means of a nut 70 to regulate the tension of the spring $b^{70}$. The return movement of the lever $b^{50}$ is limited by a back-stop $b^{75}$, shown as a head on the end of a rod $b^{76}$, the said head preferably having a buffer or cushion $b^{77}$, of rubber, leather, or other suitable material. The head or back-stop $b^{76}$ is also preferably adjustable with relation to the lever $b^{50}$ by means of a nut 71, whereby the back-stop for the lever $b^{50}$ may be properly positioned to regulate or limit the return movement of the lever, and thereby prevent the said block $b^{60}$ from striking and injuring the cam $b^{54}$. The antifriction-rollers $b^{44}$ $b^{45}$, carried by the operating-lever $b^{50}$ for the cutter-carriers coöperating with the beveled sides or portions $b^{40}$ $b^{41}$ of the said carriers, insure a rapid operation of the cutters or knives with a minimum expenditure of power, which facilitates the operation of the machine at an increased speed, consequently facilitating an increased amount of work being done with a minimum amount of wear on the operating parts.

Figure 15:
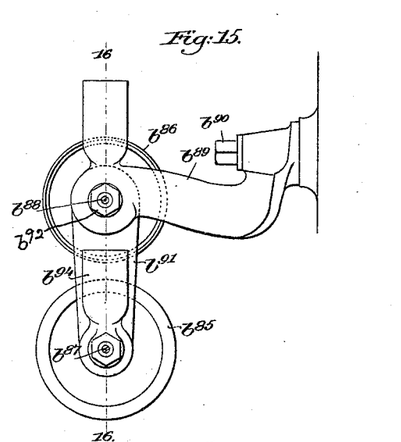
Figure 16:
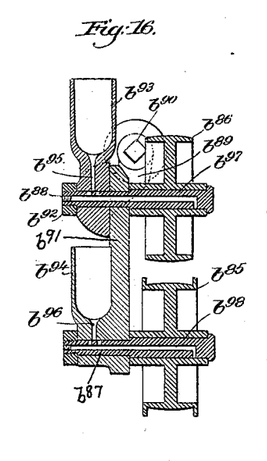
Fig. 16, a vertical section on the line 16 16, Fig. 15.

I have thus far assumed that the spindle $a^4$ is continuously revolving, which may be accomplished by means of a suitable belt, (not herein shown,) but which is passed about the pulley $a^{12}$ and over suitable idler-pulleys $b^{80}$ $b^{81}$, loose on shafts or studs $b^{82}$ $b^{82a}$, extended from opposite sides of the head $A^2$, as shown in Figs. 1 and 3, the said belt being then passed under a pulley $b^{83}$, fast on a shaft $b^{84}$, supported by the base A, the said belt also preferably passing between and in contact with pulleys $b^{85}$ $b^{86}$, loose on shafts or studs $b^{87}$ $b^{88}$, (see Figs. 15 and 16,) the shaft $b^{88}$ being supported by a stationary bracket $b^{89}$, attached to the framework of the machine by a screw-bolt $b^{90}$, and the shaft $b^{87}$ being supported by an arm $b^{91}$, loosely hung upon the shaft $b^{88}$, so as to turn thereon, but adapted to be rendered stationary in its adjusted position by means of a nut $b^{92}$ on the shaft $b^{88}$, by turning which the hanger-arm $b^{91}$ may be clamped between a shoulder on the shaft $b^{88}$ and the stationary bracket $b^{89}$. The pulley $b^{85}$ may thus be adjusted with relation to the pulley $b^{86}$ to take up the slack in the belt. The bracket $b^{89}$ and the hanger-arm $b^{91}$ may have secured to or forming part of them oil-cups $b^{93}$ $b^{94}$, respectively, provided with passages or ducts $b^{95}$ $b^{96}$, leading to longitudinal ducts or channels $b^{97}$ $b^{98}$ in the shafts $b^{88}$ $b^{87}$, and the channels or ducts $b^{97}$ $b^{98}$ are extended to the periphery of the shafts to supply the lubricant to the pulleys $b^{86}$ $b^{85}$.

By reference to Fig. 4 it will be seen that the spindle $a^4$ is not moved vertically, and therefore in order to place the boot or shoe or other work to be united by the screws cut from the continuous wire in proper successive positions the work-support or horn $d$ (see Fig. 2) is movable vertically with relation to the wire-carrying spindle $a^4$. The horn $d$ is revoluble and is clamped or otherwise fastened to an arm $d'$, herein shown as fastened by a stud-bolt $d^2$ to a horn-supporting rod or shaft $d^3$, mounted loosely in a bearing in an upright arm $d^4$, secured to or forming part of the base A, the lower end of the horn-shaft being connected, as will be described, to a controlling or measuring device or apparatus to be described, by which the length of wire inserted into the work or other material is automatically governed by the thickness of the work supported on the horn below or in line with the wire-carrying spindle. The measuring or controlling apparatus referred to consists, as herein shown, of a lever or arm $d^6$, (see Fig. 14,) mounted on a pivot, stud, shaft, or pin $d^7$, having bearings in the head $A^2$ and connected by a link or rod $d^8$ to one end of a lever or walking beam $d^9$, (see Fig. 2,) mounted on a pivot $d^{10}$, supported, as shown, in a bracket or arm $d^{14}$, secured to or forming part of a cross-bar $d^{15}$, which is secured to or forms part of the front legs $a$ of the base A.

The lever $d^{10}$ has pivotally attached to its arm $d^{16}$ an internally-threaded socket piece or block $d^{17}$, into which is extended the threaded end of a link or rod $d^{18}$, provided at its upper end with a head $d^{19}$, extended into a socket or opening $d^{20}$ in the lower end of the horn-shaft $d^3$. The lower portion of the socket $d^{20}$ is provided with screw-threads, which are engaged by a threaded sleeve or check nut $d^{21}$, adapted to fit over the rod or link $d^{18}$, and provided with a head $d^{22}$, which engages a flange or collar $d^{23}$, preferably integral with the lower end of the horn-shaft, the said flange or collar supporting a washer $d^{24}$, of leather or other suitable material, to deaden the blow of the collar $d^{23}$ against the arm $d^4$ on the upward movement of the horn. This connection of the headed rod $d^{18}$ and the horn-shaft by the check-nut is a loose one to enable the horn-shaft to revolve freely and at the same time is a positive connection to move the horn-shaft longitudinally.

Figures 2, 2A:
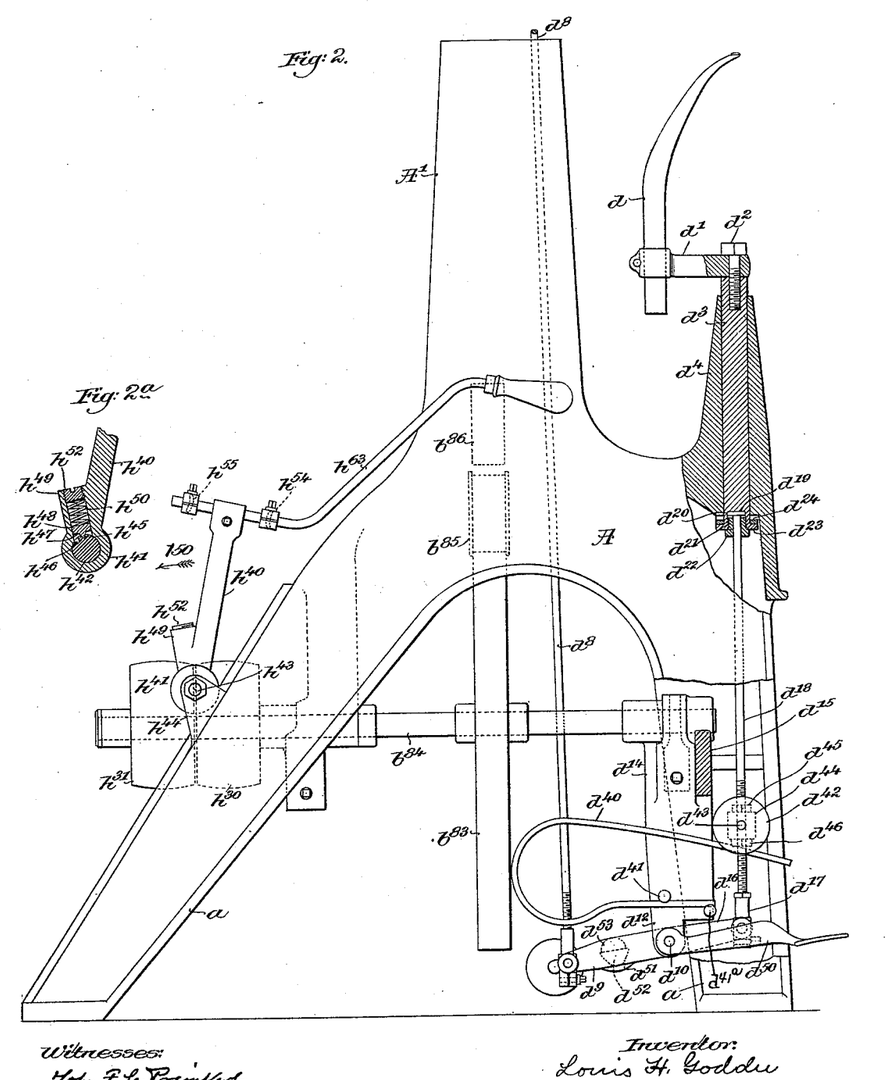

The connection of the horn-shaft $d^3$ with its operating-lever is accessible from within and below the base and permits the horn and its shaft to be quickly and easily disconnected from the link or rod $d^{18}$ for repairs or other purposes, for by an inspection of Fig. 2 it will be seen that by unscrewing the check-nut $d^{21}$ and then disconnecting the rod $d^{18}$ from the arm $d^{16}$ of the lever $d^9$ the said rod may be removed from the socket in the horn-shaft $d^3$, leaving the latter free to be dropped down through the upright arm $d^4$ as soon as the stud-bolt $d^2$ is removed from the upper end of the said shaft.

Referring to Figs. 3 to 14, it will be seen that the lever or arm $d^6$ is provided on its side with a lug or projection $d^{30}$, downwardly beveled on its outer side or face to coöperate with a correspondingly-beveled lug or projection $d^{31}$, secured to or forming part of the rear or back side of the arm $b^3$ of the lever $b$ and made of greater length than the beveled face of the lug or projection $d^{30}$, for a purpose as will be more specifically described. Furthermore, it will be seen that the links or rods $d^8$ $d^{18}$, being connected to the opposite ends of the lever $d^9$, (see Fig. 2,) move in opposite directions, and consequently when the horn $d$ is elevated into its highest position the lever $d^6$ and its attached lug or projection $d^{30}$ are moved into their lowest position, and vice versa. The elevation of the horn $d$ is effected, as herein shown, by preferably two bent springs $d^{40}$, made, for the sake of efficiency, simplicity, and cheapness, of wire rods bent into the form shown in Fig. 2 and located on opposite sides of the depending bracket or arm $d^{14}$ and having one end interposed between studs or projections $d^{41}$ $d^{41a}$ on the bracket $d^{14}$, the other ends of the said spring-rods being extended under and into engagement with grooved rollers or wheels $d^{42}$, mounted on studs or arbors $d^{43}$ on the opposite sides of a block or sleeve $d^{44}$, through which is extended the rod or link $d^{18}$, the said sleeve or block being movable on the said link or rod to regulate the tension of the springs $d^{40}$ and being locked in its adjusted position by the nuts $d^{45}$ $d^{46}$, located on the rod $d^{18}$ above and below said adjusting-sleeve. The springs $d^{40}$ normally hold the horn elevated, and to depress the same a treadle $d^{50}$ is provided which is mounted on the pivot $d^{10}$, and has a rearwardly-extended arm $d^{51}$, provided with a lug or projection $d^{52}$, which is adapted to engage a lug $d^{53}$ on the lever $d^9$, and thereby turn the lever $d^9$ on its pivot when the treadle is depressed, which action lowers the horn $d$ and permits the operator to place the boot or shoe or other work on the said horn, after which the pressure on the treadle is removed and the springs $d^{40}$ force the horn upward until the upper surface of the work comes in contact with a suitable surface, herein shown as a plate $d^{55}$, (see Fig. 1,) located below the cutter-carriers in close proximity thereto and secured to the head $A^2$, as by a bolt or screw $d^{56}$. (See Figs. 3, 9, and 11.)

When the horn $d$ is depressed to place the work thereon, the lever $d^6$ and its lug $d^{30}$ are elevated, and the said lug is moved upward away from its coöperating beveled lug or block $d^{31}$ on the wire-feed-operating arm $b^3$ of the lever $b$, and when the horn again ascends with the work on it the lever $d^6$ and its lug $d^{30}$ are lowered until the horn is stopped on its upward movement by the engagement of the stock or work with the plate $d^{55}$, or it may be the cutter-carriers, and at such time the lug $d^{30}$ is placed in a position with relation to the lug $d^{31}$ as will permit the arm $b^3$ of the lever $b$ to move backward toward the lug $d^{30}$ a distance proportionate to the thickness of the work on the horn. It will thus be seen that the position of the back-stop or beveled lug $d^{30}$ with relation to the beveled lug $d^{31}$ on the wire-feed-operating lever $b$ is a variable one, depending on the thickness of the work interposed between the horn and the wire-carrying spindle, and that the position of the back-stop $d^{30}$ determines the length of the upstroke of the sleeve $a^{15}$ and thereby determines the length of wire inserted into the work. In other words, the back-stop $d^{30}$, coöperating with the wire-feed mechanism, constitutes a measuring device for the length of wire to be inserted into the work, and this measuring device is automatically controlled by the thickness of the work into which the particular portion of the wire is to be inserted. If a thin portion of the work is interposed between the horn and the wire-spindle, the back-stop is not raised so high, and presents its wider or thicker upper portion to the lug $d^{31}$, so that the latter will strike the back-stop sooner than when a thicker portion of the work is on the horn, and consequently the upstroke of the sleeve $a^{15}$ will be shortened, so that on its downward movement only a short length of wire will be fed into the work. This variable feed of the wire is effected by the back-stop $d^{30}$ limiting the backward or return movement of the arm $b^3$, which places the roll $b^5$ in variable positions with relation to the feed-operating cam $b^{17}$, so that more or less of the cam-surface between the points 20 21 will act on the roll $b^5$ and move the sleeve $a^{15}$ downward. After a screw has been inserted into the work and severed from the continuous wire the work is fed forward a predetermined distance to place a new portion into line with the nose-piece $a^{10}$ of the wire-carrying spindle $a^4$, and this feed of the work is effected with the horn lowered away from the spindle-head and its plate $d^{55}$.

The lowering of the horn may and preferably will be effected by mechanism as will now be described. The lever $d^6$, which, as above described, is connected to the horn $d$, has secured to or forming part of it at its outer end a curved arm or segment $c$, extended in an upward direction, as herein shown, and preferably provided on its outer surface with teeth, (see Figs. 3 and 14,) the said curved arm or segment moving in the arc of a circle with the pivot of the lever $d^6$—that is, the shaft $d^7$—as a center, the said segment or arm being shown as secured to the end of the lever $d^6$ by a screw-bolt $c'$. The segment or curved arm $c$ has coöperating with it an arm $c^2$, preferably provided with a tooth or projection, and in the present instance acting as a push-pawl, the said arm being pivoted, as at $c^3$, in a lug or projection $c^4$, (see Figs. 3 and 14,) and in the end of a lever $c^5$, loosely mounted on the shaft or pivot $d^7$, and provided at its rear end with a stud or roller $c^6$, adapted to enter a cam path or groove $c^7$ in the side or face of a cam $c^8$, fast on the cam-shaft $b^{19}$, and in the present instance secured to or forming part of the cams $b^{17}$ $b^{54}$, the periphery $c^9$ of the cam $c^8$ being also shaped to form an operating cam for the work-feeding mechanism, as will be described.

The push-pawl $c^2$ is adapted to be engaged with the segmental ratchet-surface $c$ by a spring $c^{10}$, fastened at one end to the lug or projection $c^4$ and having its other or free end bearing against the back of the pawl $c^2$.

The engagement of the push-pawl $c^2$ with the segmental ratchet-surface $c$ is determined by a controlling device, herein shown as a block or piece $c^{13}$, (see Fig. 3,) preferably adjustably secured to the framework of the machine, it being shown in Fig. 3 as provided with a slot $c^{14}$, through which is extended a clamping-bolt $c^{15}$. The controlling block or device $c^{13}$ is normally engaged by a crank or arm $c^{16}$, fast on the pivot $c^3$ for the pawl $c^2$, and when so engaged the crank or arm is turned so that the pawl $c^2$ is held away from or out of engagement with the ratchet-surface $c$, thereby leaving the said surface free to move independent of the lever or arm $c^5$.

Figure 14:
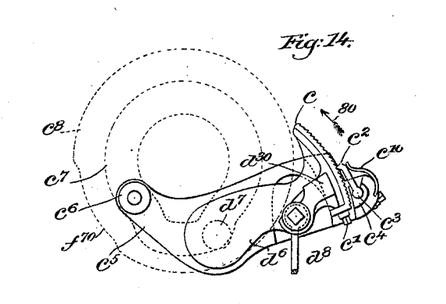
Fig. 14, a detail, on an enlarged scale, of the measuring apparatus for the wire-feed mechanism.

The cam-groove $c^7$ is properly formed and timed with relation to the other parts of the machine, so as to operate the lever $c^5$ and turn it on its pivot $d^7$, so as to move its long or pawl-carrying arm upward in the arc of a circle, as indicated by the arrow 80, Fig. 14, at or about the time the screw in the work is severed from the continuous wire. On the upward travel of this pawl-carrying arm of the lever $c^5$ the crank or arm $c^{16}$ is carried over the upper surface of the controlling-block $c^{13}$ until it passes off from or out of engagement with said block, and at such time the spring $c^{10}$ acts and throws the push-pawl $c^2$ into engagement with a tooth of the ratchet-surface $c$, so that on the continued movement of the pawl-carrying lever $c^5$ in the direction indicated by the arrow 80 the ratchet-segment $c$ and its lever $d^6$ will be moved as one piece with the pawl-carrying lever $c^5$, which movement will be continued until the point of greatest throw of the cam-groove $c^7$ has passed by the roller or stud $c^6$. As the lever $d^6$ is moved upward, as described, the horn $d$ is moved downward to a like extent, away from the spindle-head, thereby leaving the work free to be fed forward a predetermined distance to present a new surface or portion of the work, into which a screw may be inserted. When the work has been fed forward a predetermined distance, as will be described, the cam $c^8$ returns the pawl-carrying lever back to its normal position, and on the return movement of the pawl-carrying lever the crank or arm $c^{16}$ is again brought back upon the controlling-block, which operation turns the pivot $c^3$ against the action of the spring $c^{10}$ and disengages the pawl $c^2$ from its coöperating ratchet-segment $c$, thereby placing the latter and its lever $d^6$ under control of the horn-springs $d^{40}$, which move the said horn upward and the lever $d^6$ downward until the work engages the guard $d^{55}$. It will be seen that the downward movement of the horn $d$ against the action of its spring $d^{40}$ commences when the pawl $c^2$ engages the ratchet-segment $c$ to effect a positive connection of the horn mechanism with the cam-operated lever $c^5$, and that the extent of movement of the horn down away from the wire-carrying spindle depends upon the position of the controlling block or device $c^{13}$, which may be adjusted so that the crank or arm $c^{16}$ will remain in engagement with it a longer or shorter time, and thereby prevent the engagement of the pawl $c^2$ with its ratchet-segment until the cam $c^8$ has completed more or less of its cycle, and as some operators may desire to have the horn lowered more than other operators the controlling device $c^{13}$ is preferably made adjustable. It will further be seen that the block $c^{13}$ constitutes the controlling device for the positive connection of the horn mechanism with the cam mechanism, which ultimately effects its downward movement to permit the work to be fed, which may and preferably will be effected by a mechanism as will be described.

The work-feed mechanism herein shown consists of a bar $f$, (see Figs. 1, 3, 11, 12, and 13,) having its front portion located below the cutter-carriers and provided at its end with teeth or serrations $f'$ to engage the work and inclined in the direction it is desired to feed the work, the said bar having its rear portion provided with a rack-bar $f^2$, which may be secured to or form part of the bar $f$, and which in the present instance is shown in Fig. 13 as fastened to the bar $f$ by a screw $f^3$. The rack-bar $f^2$ engages with a pinion $f^4$, rotatable in a transverse opening in the lower end of a lever $f^5$, mounted on a pivot rod or shaft $f^6$, (see dotted lines, Fig. 1,) which is supported by the head $A^2$, the said lever having an arm $f^7$, carrying a roller $f^8$, which bears upon and is operated by the peripheral cam $c^9$.

The roller $f^8$, carried by the arm $f^7$ on the work-feed lever $f^5$, may and preferably will be held in engagement with the cam $c^9$ by a spring $f^{60}$, (see Figs. 1 and 1$^a$,) preferably a wire rod coiled about the end of the rock-shaft $f^6$, and having one end fastened to the head or frame of the machine and its other end fastened to an adjusting-collar $f^{61}$, fastened to the shaft $f^6$ by a threaded bolt $f^{62}$. In the present instance one end of the spring $f^{61}$ is represented as inserted into a suitable hole in the end of the head $A^2$ and the other end into a suitable hole in the collar $f^{61}$. By loosening the bolt $f^{62}$ the collar $f^{61}$ may be turned to increase or diminish the tension of the spring $f^{60}$, after which the collar $f^{61}$ may be rendered fast to the shaft $f^6$ by tightening up the bolt $f^{62}$.

The lever $f^5$ is oscillated in a vertical plane in one direction, as herein shown, by the cam $c^9$ and in the opposite direction by the spring $f^{60}$, which is permitted to rock the shaft $f^6$ when the reduced portion $f^{70}$ of the cam $c^9$ (see Fig. 14) is brought opposite to the roller $f^8$. The rocking of the shaft $f^6$ by the spring effects the movement of the lever $f^5$ so as to feed the work on the horn $d$, which is carried forward by the teeth $f'$ on the end of the bar $f$, the said teeth being inclined in the direction of the feed or movement of the work, so that they may slip back over the work on the return movement of the bar $f$ to its normal position, effected by the full periphery of the cam $c^9$ acting on the roller $f^8$. This feed of the work is timed with relation to the other operations so that the work is fed forward while the horn $d$ is lowered, but so that the backward or return movement of the feed-bar $f$ takes place at or about the time the horn has been raised, so as to firmly push the work against the guard $d^{55}$. The forward movement or feed of the work may be regulated by an adjusting device, shown as a screw $f^{75}$, (see Fig. 1,) extended through the side-bar 5 of the head $A^2$.

The pinion $f^4$ may be rotated to adjust the bar $f$ with relation to the horn $d$ and the work thereon by a crank or handle $f^{80}$, fast on the shaft $f^{81}$ of the said pinion, the said shaft on the opposite side of the lever $f^5$ being encircled by a spiral spring $f^{82}$, (see Fig. 12,) interposed between the lever and adjusting-nuts $f^{83}$ on the said shaft, the said spring frictionally holding the pinion from moving, and thereby holding the bar $f$ in its adjusted position.

The coil of the continuous threaded wire from which the screws are made and inserted into the work, and which is not herein shown, as it may be of any suitable or desired construction, is supported on a reel $g$, (see Fig. 4,) mounted on a sleeve $g'$ and rendered fast thereon by a threaded nut $g^2$, screwed upon the threaded end of the said sleeve, the said nut clamping the reel $g$ between it and a head $g^3$ on the said sleeve. The sleeve $g'$ and its reel are mounted to revolve on a stud bolt or shaft $g^4$, supported in upright arms $g^5$ $g^6$, secured to or forming part of the wire-carrying spindle $a^4$. The reel $g$ has one of its sides, as $g^7$, detachable, so as to permit the coil of threaded wire (not herein shown) to be placed in position on the reel, which may be accomplished by removing the shaft $g^4$ from its supports $g^5$ $g^6$, the nut $g^8$ on the said shaft having been removed, then withdrawing the reel from between the supports $g^5$ $g^6$, unscrewing the nut $g^2$, and removing the side $g^7$ of the reel. In order to prevent the formation of slack in the continuous threaded wire, the sides of the reel are provided with suitable friction-surfaces, preferably leather washers $g^8$, set into suitable recesses in the sides of the reel and engaging the upright arms of the wire-carrying spindle.

Figure 17:
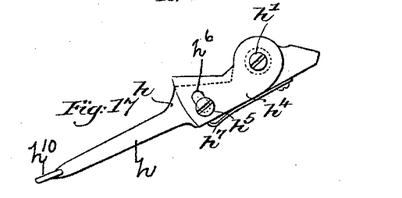
Fig. 17, a detail in plan of the wire-feed-stopping mechanism.

In order to permit the wire-feed mechanism to be rendered inoperative without stopping the machine, so that the operator may place on and remove the work from the horn, a stopping device is provided for the said wire-feed mechanism, which stopping device consists, as herein shown, of an arm or lever $h$, (see Figs. 3, 11, and 17,) pivotally mounted on a stud or pin $h'$ in a boss or ear $h^2$ on the side 3 of the head $A^2$ and supporting a latch-plate $h^4$, loosely mounted on the pivot-pin $h'$ and movable on the upper surface of the arm $h$, between it and the head of a screw $h^5$, which is inserted into the arm $h$ through a limiting-slot $h^6$ in the plate or arm $h^4$, the latter being pressed on one side by a spring $h^7$, fastened at one end to the arm $h$, as clearly shown in Fig. 17, which spring tends to keep the opposite side of the plate $h^4$ into engagement with a square or other projecting block or lug $h^9$, secured to or forming part of the lever $b$, (see Fig. 3,) when the arm $h$ is turned so as to bring the latch-plate $h^4$ into engagement with the said block or lug, which by the movement of the lever $b$ is carried upward above the plate $h^4$ when the sleeve $a^{15}$ is at its lowest position, thereby permitting the spring $h^7$ to move the plate $h^4$ below or into the path of movement of the block or lug $h^9$ and thus offer a solid abutment for the lug or block $h^9$, so that the lever $h$ is held in its lowermost position against the action of its returning-spring $b^9$.

The pivot stud or pin $h'$ for the arm or lever $h$ is adapted to be frictionally held in any position into which it may be turned by a friction-brake consisting of a shoe $h^{60}$, adapted to engage the said pin or stud and provided with a rod or stem $h^{61}$, movable in a hollow lug or boss $h^{62}$ on the ear $h^2$, the said rod being encircled by a suitable spring $h^{63}$, which bears against the said brake-shoe and against a cap which closes the said hollow boss.

The arm $h$ may and preferably will be provided at its front end with a handle or finger-piece $h^{10}$ for the convenience of the operator, and by which the lever or arm $h$ may be turned on its pivot to remove the stopping arm or plate away from or out of the path of movement of the block or lug $h^9$. It is evident that the plate $h^4$ might be made a part of the lever $h$, but in this case the operator would have to watch the machine until the lug or block $h^9$ has been carried above the plane of movement of the arm $h$, but by making the plate automatic in its action, by means of the spring $h^7$, and limiting its movement by the slot $h^5$, the arm $h$ may be turned toward the machine with the block or lug $h^9$ in its lowered position and the sleeve $a^{15}$ in its elevated position, and as soon as the block or lug $h^9$ was elevated above the plane of movement of the plate $h^4$ the spring $h^7$ would throw the said plate into the path of movement of the said lug and prevent its lever $b$ being moved by the spring $b^9$ back into its normal position, so as to enable it to be again moved by the cam $b^{17}$. The lever $h$ is held in this position by the brake mechanism above described. When it is desired to again start the feed of the wire, the lever or arm $h$ is thrown outward, as described.

The machine herein described is designed and constructed to operate at a great speed to thereby increase the capacity or output of the machine, and its various operative parts are reduced to a minimum and made as positive as possible to avoid frequent stopping of the machine due to breakage of parts, and on account of the high speed of the revolving spindle $a^4$ I have provided the machine with an inclosing casing or protective armor $h^{13}$ for the wire-carrying reel, which casing is made hollow or bonnet-shaped, having an open bottom to fit over the reel and the upper part of the spindle $a^4$, and provided with a rearwardly-extended lug or arm $h^{20}$, pivotally secured at $h^{21}$ to a lug or upright $h^{22}$, erected from the top 4 of the head $A^2$. The head $A^2$ is provided at its rear portion with an enlarged reservoir $h^{23}$ for the lubricating-oil, which reservoir is adapted to contain a substantially large quantity of oil and communicates with the bearings for the spindle $a^4$.

The shaft $b^{84}$, constituting the main shaft for the machine, may be driven in any suitable manner, and is herein shown as provided with fast and loose pulleys $h^{30}$ $h^{31}$, adapted to be engaged by a driving-belt, (not shown,) but which may be transferred from the loose to the fast pulley, and vice versa, by a shipper mechanism preferably of the construction herein shown (see Fig. 2) and consisting of an arm or lever $h^{40}$, provided with a hub $h^{41}$, loosely mounted, as herein represented, on a stud or bolt $h^{43}$, secured in a bracket or lug $h^{44}$ on a foot $a$ of the base A, the said stud having teeth or notches $h^{45}$ $h^{46}$, (see Fig. $2^a$,) which are designed to be engaged by a projection or tooth $h^{47}$ on a block or piston $h^{48}$, movable in a hollow arm or cylinder $h^{49}$, extended from the hub $h^{41}$.

The hollow arm $h^{49}$ contains within it a spring $h^{50}$, which serves to keep the tooth $h^{47}$ in engagement with one or the other of the notches $h^{45}$ $h^{46}$ and thereby lock the shipper-lever $h^{40}$ to the stud or bolt $h^{42}$, the said spring abutting against a removable plug or cap $h^{52}$ for the hollow arm $h^{49}$. The shipper-lever $h^{40}$ has secured to it a handle-bar $h^{63}$, provided with suitable belt-engaging arms $h^{54}$ $h^{55}$. As shown in Fig. 2, the belt may be supposed to be on the fast pulley $h^{30}$, and by lifting the handle-bar $h^{63}$ the shipper-lever $h^{40}$ may be turned on the bolt $h^{41}$ in the direction indicated by the arrow $l^{50}$, thereby removing the tooth $h^{47}$ from engagement with the notch $h^{45}$ and engaging it with the notch $h^{46}$ when the shipper-lever has been turned sufficiently to place the driving-belt on the loose pulley $h^{31}$. A reverse movement of the shipper-lever again brings the belt onto the fast pulley $h^{30}$.

By making the horn-shaft rotatable a longer bearing may be obtained and employed to prevent vibration of the horn and thereby reduce wear upon the machine.

The friction mechanism or brake acting on the pivot-pin $h'$ of the arm or lever $h$ is made sufficiently great to overcome the action of the latch-spring and thereby prevent the latch-spring from turning the lever on its pivot in a backward direction when the latch-plate engages the face of the block or lug $h^9$. As a result of this construction the latch-plate when brought into contact with the face of the lug or block $h^9$ is maintained in contact therewith and in position to be thrown by its own spring $h^7$ into the path of movement of the said lug, when the lever $b$ is in its lowermost or proper position to permit such movement.

The head $A^2$, as herein shown, is provided with an offset $s$, (see Fig. 3,) provided with a suitable passage by which oil may be supplied to the bearings for the wire-carrying spindle, and access may be had to the bottom of said passage by removing a screw $s'$.

I claim—

1. In a machine for inserting metallic fastenings into work, the combination of the following instrumentalities, viz: a supporting-head, a rotating wire-carrying spindle having bearings in said head, wire-feeding devices carried by said spindle, and an actuating mechanism for said wire-feeding devices consisting of a sleeve loosely fitted over and longitudinally movable on said spindle, a pivot pin or rod $b^2$ having bearings in the said head and extended to the opposite sides thereof, levers $b$ $b'$ fast on the said pivot pin or rod on opposite sides of the said head, a collar loose on said sleeve and to which the front ends of said levers are hinged at substantially diametrically opposite points and on opposite sides of the head to guide the said sleeve in its longitudinal movement on the spindle, a cam operating on one of said levers to effect the downward movement of the said levers, collar and sleeve, means to move the levers in an opposite direction to lift and suspend the collar and its connecting-sleeve, a beveled or inclined measuring-surface on one of said levers, and a beveled or inclined back-stop coöperating with said measuring-surface and having a sliding engagement therewith to limit the backward movement of said lever, substantially as described.

2. In a machine for inserting metallic fastenings into work, the combination of the following instrumentalities, viz: a supporting-head, a rotating wire-carrying spindle having bearings in said head, wire-feeding devices carried by said spindle, and an actuating mechanism for said wire-feeding devices consisting of a sleeve longitudinally movable on said spindle and connected to the wire-feeding devices to operate the same when moved in one direction, a pivoted lever connected to said sleeve to operate it, a cam to act on said lever, a beveled or inclined measuring-surface on said lever, and a beveled or inclined back-stop coöperating with said measuring-surface and having a sliding engagement therewith to limit the backward movement of the said lever, substantially as described.

3. In a machine for inserting metallic fastenings into work, the combination of the following instrumentalities, viz: a supporting-head, a rotating wire-carrying spindle having bearings in said head, wire-feeding devices carried by said spindle, and an actuating mechanism for said wire-feeding devices consisting of a sleeve longitudinally movable on said spindle and connected to the wire-feeding devices to operate the same when moved in one direction, a pivoted lever connected to said sleeve to operate it, a cam to act on said lever, a measuring-surface on said lever beveled with relation to the pivot thereof, a back-stop provided with a beveled surface coöperating with the beveled measuring-surface of the said lever and movable with relation to the beveled measuring-surface to vary the backward movement of the said lever, a work-support or horn vertically movable with relation to said head and to which said beveled back-stop is connected to move simultaneously therewith to vary the position of the inclined back-stop with relation to the inclined measuring-surface on the said lever, and means to return the lever in opposition to the said cam, substantially as described.

4. In a machine for inserting metallic fastenings into work, the combination of the following instrumentalities, viz: a supporting-head, a rotating wire-carrying spindle having bearings in said head, wire-feeding devices carried by said spindle, and an actuating mechanism for said wire-feeding devices consisting of a sleeve longitudinally movable on said spindle and connected to the wire-feeding devices to operate the same when moved in one direction, a pivoted lever connected to said sleeve to operate it, a beveled or inclined measuring-surface attached to said lever, a cam to act on said lever, a work-support movable toward and from the wire-carrying spindle, a beveled or inclined back-stop for the said lever connected to said work-support to move simultaneously therewith but in an opposite direction thereto, to place the said back-stop in various positions with relation to the beveled or inclined measuring-surface on the said lever, substantially as and for the purpose specified.

5. In a machine for inserting metallic fastenings into work, the combination of the following instrumentalities, viz: a work-support or horn movable in a substantially vertical plane, means to effect the up movement of the said work-support, and means to positively effect its downward movement and consisting of a cam, a lever or arm operated thereby, a curved arm or segment, a lever to which said segment is attached connected to the said horn to move simultaneously therewith, an arm movable with the cam-operated lever and adapted to engage the said segment to place the horn under control of the cam-operated lever, and means to control the engagement of the said arm with the said segment, substantially as described.

6. In a machine for inserting metallic fastenings into work, the combination of the following instrumentalities, viz: a work-support or horn movable in a substantially vertical plane, means to effect the up movement of the said work-support, and means to positively effect its downward movement and consisting of a cam, a lever or arm operated thereby, a curved arm or segment, a lever to which said segment is attached connected to the said horn to move simultaneously therewith, an arm movable with the cam-operated lever and adapted to engage the said segment to place the horn under control of the cam-operated lever, and adjustable means to control the engagement of the said arm with the said segment, substantially as described.

7. In a machine for inserting metallic fastenings into work, the combination of the following instrumentalities, viz: a supporting-base provided with a hollow upright, a horn-shaft extended through said hollow upright and rotatable therein, and provided at its lower end with a socket internally screw-threaded, a connecting-rod $d^{18}$ provided with a head extended into said socket, and a check-nut or threaded sleeve fitted on the said connecting-rod and provided with external screw-threads to engage the screw-threads of the said socket, substantially as described.

8. In a machine for inserting metallic fastenings into work, the combination of the following instrumentalities, viz: a vertically-movable work-support or horn, a shaft to which it is secured, a lever, a connecting-rod joining said horn-shaft and lever, a sleeve $d^{44}$ movable longitudinally on said rod and provided with studs or arbors on its opposite sides, grooved rollers mounted on said studs or arbors, means to lock said sleeve in its adjusted position, and bent spring-rods having one end anchored to a fixed support, and their other or free ends engaging the under side of the said grooved rollers to force the connecting-rod and horn upward, substantially as described.

9. In a machine for inserting metallic fastenings into work, the combination of the following instrumentalities, viz: a rotating wire-carrying spindle, wire-feeding devices carried by said spindle, and an actuating mechanism for said wire-feeding devices consisting of a sleeve longitudinally movable on said spindle and connected to the wire-feeding devices to operate the same when moved in one direction, a pivoted lever connected to said sleeve to operate it, a cam to act on said lever, and a wire-feed-stopping device coöperating with said lever and consisting of an arm or lever movable toward and from the cam-actuated lever, and a spring-actuated plate or arm carried by the said movable arm and adapted to be projected into the path of movement of the cam-actuated lever, substantially as and for the purpose specified.

10. In a machine for inserting metallic fastenings into work, the combination of the following instrumentalities, viz: a horn or work-support movable longitudinally in opposite directions, means to move it in one direction, and means to move it in an opposite direction, consisting of a pivoted lever provided with a segmental arm and to which the horn is connected, a cam-operated lever movable independently of the said pivoted arm, means carried by the said lever and coöperating with the said segmental arm to effect a connection between the said lever and segmental arm, and a controlling device to regulate the said connection and thereby the extent of movement of the said horn, substantially as described.

11. In a machine for inserting metallic fastenings into work, the combination of the following instrumentalities, viz: a wire-carrying spindle, a wire-feed mechanism, and a wire-cutting mechanism consisting of cutter-carriers pivotally mounted on separate pivots in substantially the same horizontal plane below the said spindle and provided with inclined portions $b^{40}$ $b^{41}$ on one side of said pivots, cutters or knives carried by said carriers on the other side of said pivots, a pivoted lever having one arm extended between said carriers and movable toward the pivots of the said carriers in engagement with the inclined portions $b^{40}$ $b^{41}$ to turn the cutter-carriers on their pivots and engage the knives with the wire and sever the portion inserted into the stock, and means acting on the said carriers to return them to their normal position as the said lever moves back on the inclined portions away from said pivots, substantially as described.

12. In a machine for inserting metallic fastenings into work, the combination of the following instrumentalities, viz: the head $A^2$ provided with depending front arms 6, a wire-carrying spindle having bearings in said head, a wire-feed mechanism, cutter-carriers pivoted to the under side of the depending arms on separate pivots and having their rear arms provided on their inner sides with inclined portions $b^{40}$, $b^{41}$, and with straight portions $b^{42}$, $b^{43}$, cutters or knives carried by said carriers, a cam-operated lever pivoted to said head and having one arm normally in engagement with the straight portions $b^{42}$, $b^{43}$, of the said cutter-carriers and movable between the cutter-carriers toward their pivots in engagement with the said inclined portions, to act on the inclined portions of the said carriers and cause the cutters to act on and sever the wire, and means to return the carriers to their normal position as the arm of the cam-lever travels back on the inclined portions of the carriers, substantially as described.

13. In a machine for inserting metallic fastenings into work, the combination of the following instrumentalities, viz: a wire-carrying spindle, a wire-feed mechanism, pivoted cutter-carriers mounted on separate pivots in substantially the same horizontal plane below the said spindle and having their rear arms provided with inclined portions $b^{40}$, $b^{41}$, and with substantially straight portions $b^{42}$, $b^{43}$, cutters or knives carried by said carriers, a cam-operated lever normally engaging the straight portions $b^{42}$, $b^{43}$ and movable between the said cutter-carriers toward and from their pivots to travel up the inclined portions of the said carriers to cause the cutters to act on and sever the wire, springs to act on the cutter-carriers in opposition to the cam-lever as the lever travels down the said inclined portions, and a bunter or back-stop for said cam-lever to limit the backward movement of the said lever with its lower end in engagement with the straight portions $b^{42}$, $b^{43}$ of the cutter-carriers, substantially as described.

14. In a machine for inserting metallic fastenings into work, the combination of the following instrumentalities, viz: a supporting-head, a wire-carrying spindle having bearings therein, a wire-feed mechanism, pivoted cutter-carriers mounted on separate pivots in substantially the same horizontal plane and having their rear arms provided on their inner sides with inclined portions, cutters or knives carried by said carriers, a cam-operated lever pivoted in said head and movable between said carriers toward their pivots in engagement with the inclined portions of the said carriers to cause the cutters to act on and sever the wire, springs to act on the cutter-carriers in opposition to the cam-lever as the latter travels back on the said inclined portions, and an adjustable bunter or back-stop for said cam-lever, substantially as described.

15. In a machine for inserting metallic fastenings into work, the combination of the following instrumentalities, viz: a wire-carrying spindle, a wire-feed mechanism, a wire-cutting mechanism consisting of cutters or knives, pivoted carriers for said knives having their rear ends provided with inclined portions, a pivoted lever having its lower arm movable in a substantially vertical plane to act on the cutter-carriers, and its other or upper arm extended at an angle to said lower arm, and a cam to act on the said upper arm, substantially as and for the purpose specified.

16. In a machine for inserting metallic fastenings into work, the combination of the following instrumentalities, viz: a wire-carrying spindle, a wire-feed mechanism, a wire-cutting mechanism consisting of cutters or knives, pivoted carriers for said knives having their rear ends provided with inclined portions, a pivoted lever having its lower arm movable in a substantially vertical plane to act on the cutter-carriers, and its other or upper arm extended at an angle to said lower arm, a cam to act on the said upper arm, a spring to move said lever in opposition to the said cam, and a stop to limit the return movement of the said lever, substantially as described.

17. In a machine for inserting metallic fastenings into work, a work-feeding mechanism consisting of a feed-bar provided with teeth or projections to engage the work, a supporting-lever for said feed-bar, means to move said feed-bar in said lever, a cam to operate said lever and effect the movement of the feed-bar in one direction, a spring to move said lever in an opposite direction, means to adjust the tension of said spring, and an adjustable stop to limit the movement of the lever in the direction to effect the feed of the work, substantially as described.

18. In a machine for inserting metallic fastenings into work, the combination of the following instrumentalities, viz: a hollow wire-carrying spindle provided at its lower end with a socket, a hollow or recessed head for said spindle having a hollow stem $a^8$ inserted into said socket and provided with a wall 14 provided with a longitudinal slot, feed-rolls within said head, a driving pinion or gear for the said feed-rolls in line with the longitudinal slot in the wall 14, a sleeve encircling the wire-carrying spindle and loose thereon, a sliding plate or bar $a^{44}$ separate from the wire-carrying spindle, attached to said sleeve to move therewith, dovetailed into the wall 14 of the said spindle-head, and provided with a rack-bar $a^{43}$ of less width than the plate $a^{44}$ and extended into the longitudinal slot in the wall 14 of the spindle-head to engage the driving-pinion for the feed-rolls, and means to reciprocate said sleeve, plate and rack-bar, substantially as described.

19. In a machine for inserting metallic fastenings into work, the combination of the following instrumentalities, viz: a supporting-base provided with a head having mounted therein a wire-carrying spindle provided at its upper end with a reel for a coil of wire, a bonnet or cap pivotally secured to the said head to move in a substantially vertical plane and adapted to fit over the said reel and the upper part of said spindle, substantially as described.

20. In a machine for inserting metallic fastenings into work, the combination of the following instrumentalities, viz: a rotating wire-carrying spindle, a wire-feed mechanism, an actuating mechanism for said wire-feed mechanism consisting of a lever provided with an inclined or beveled surface, and a cam to rotate said lever in one direction, a measuring device for the wire-feed mechanism consisting of a lever provided with an inclined or beveled surface coöperating with the inclined or beveled surface on the said wire-feed lever and constituting a back-stop therefor, and a work-support or horn to which the said beveled back-stop is connected to move in opposite directions to the said horn, substantially as described.

21. In a machine for inserting metallic fastenings into work, the combination of the following instrumentalities, viz: a wire-feed mechanism, a lever coöperating therewith, means to act on the said lever to effect the feed of the wire, means to move the lever backward, a vertically-movable horn or work-support, a back-stop for the said feed-lever movable with the said horn and automatically positioned with relation to the said lever by the thickness of the work acted upon, and mechanism normally disconnected from said back-stop but adapted to be automatically connected thereto, to move the said back-stop in the same direction it is moved by the work but independent thereof, substantially as and for the purpose specified.

22. In a machine for inserting metallic fastenings into work, the combination of the following instrumentalities, viz: a supporting-base, a substantially vertical horn-supporting shaft rotatably mounted in said base, a horn firmly secured to the upper end of said shaft, a lever, a connecting-rod attached to said lever, and means to loosely yet positively attach said connecting-rod to said horn-shaft, to effect a positive movement of the said horn-shaft in opposite directions and yet permit the said horn-shaft to rotate freely, substantially as and for the purpose specified.

23. In a machine for inserting metallic fastenings into work, the combination of the following instrumentalities, viz: a vertically-movable work-support or horn, a rotatable shaft to which the horn is firmly secured at the upper end thereof, an operating-lever, a connecting-rod attached to said lever at one end, means to positively yet loosely connect the opposite end of the said rod to said shaft to effect its movement in opposite directions without interfering with its rotary movement, an adjustable device or stop movable on said connecting-rod, and springs composed of bent wire rods anchored at one end and having their free ends engaging said stop or device to force the said connecting-rod and its horn-shaft upward, and having its tension regulated by the movement of the said stop or device on the said rod, substantially as described.

24. In a machine for inserting metallic fastenings into work, the combination of the following instrumentalities, viz: a wire-feed mechanism, a lever coöperating therewith, means to act on the said lever to effect the feed of the wire, means to move the lever backward, a horn or work-support, a back-stop for the said feed-lever movable with the said horn, and automatically positioned with relation to the said lever by the thickness of the work acted upon, and means normally disconnected from said back-stop but adapted to be connected thereto, to move the said back-stop in the same direction it is moved by the work but independent thereof, substantially as and for the purpose specified.

25. In a machine for inserting metallic fastenings into work, the combination of the following instrumentalities, viz: a supporting-base, a substantially vertical horn-supporting shaft rotatably mounted in said base, a lever, a connecting-rod attached to said lever, and means to loosely yet positively attach said connecting-rod to said horn-shaft, to effect a positive movement of the said horn-shaft in opposite directions and yet permit the said horn-shaft to rotate freely, substantially as and for the purpose specified.

26. In a machine for inserting metallic fastenings into work, the combination of the following instrumentalities, viz: a vertically-movable work-support or horn, a rotatable shaft to which it is secured, an operating-lever, a connecting-rod attached to said lever at one end, means to positively yet loosely connect the opposite end of the said rod to said shaft to effect its movement in opposite directions without interfering with its rotary movement, an adjustable device or stop movable on said connecting-rod, and springs composed of bent wire rods anchored at one end and having their free ends engaging said stop or device to force the said connecting-rod and its horn-shaft upward, and having its tension regulated by the movement of the said stop or device on the said rod, substantially as described.

27. In a machine for inserting metallic fastenings into work, the combination of the following instrumentalities, viz: a hollow wire-carrying spindle, a hollow or recessed head for said spindle, wire-feed rolls located within the said recessed head and provided with gear-teeth in mesh with each other within said recess and having screw-threads on their inner circumferences, and shafts or arbors for said feed-rolls extended across the said recess and having bearings in solid portions of the said head and provided with tapering portions intermediate of the ends and having screw-threads to engage the screw-threaded inner circumference of the said feed-rolls, substantially as described.

28. In a machine for inserting metallic fastenings into work, the combination of the following instrumentalities, viz: a work-support or horn movable in a substantially vertical plane, a lever to which said horn is connected, a toothed segment connected to said lever, a pivoted arm or lever to which said toothed segment is attached, an arm or pawl coöperating with said toothed segment, a lever in which said pawl is loosely pivoted movable on the same center as the segment-carrying lever but independent thereof, a cam to operate the pawl-carrying lever, an arm on the pivot for the said pawl, a block with which said arm coöperates to normally hold the said pawl out of engagement with the toothed segment, and means to engage the said pawl with the toothed segment when the said arm is unacted upon by the said block, substantially as described.

29. In a machine for inserting metallic fastenings into work, the combination of the following instrumentalities, viz: a rotatable wire-carrying spindle, wire-feeding devices carried thereby, a wire-feed mechanism, an actuating mechanism for said wire-feed mechanism consisting of a pivoted lever connected to the wire-feed mechanism, a cam to operate said lever, a beveled surface on said lever, a beveled lug coöperating with said surface to form a back-stop therefor, a lever to which said beveled lug is attached, a horn or work-support, intermediate connections joining said work-support with the back-stop-carrying lever, a segment attached to the lug-carrying lever, a pawl or arm coöperating therewith, a lever supporting said pawl or arm, a cam to operate said pawl-carrying lever, and means to control the engagement of the said pawl or arm with the said segment, substantially as described.

30. In a machine for inserting metallic fastenings into work, the combination of the following instrumentalities, viz: a rotating wire-carrying spindle, wire-feeding devices carried by said spindle, and an actuating mechanism for said wire-feeding devices consisting of a sleeve longitudinally movable on said spindle and connected to the wire-feeding devices to operate the same when moved in one direction, a pivoted lever connected to said sleeve to operate it, a cam to act on said lever, and a wire-feed-stopping device coöperating with said lever and consisting of an arm or lever movable toward and from the cam-actuated lever, and a spring-actuated plate or arm carried by the said movable arm and adapted to be projected into the path of movement of the cam-actuated lever, and a brake mechanism for the said arm or lever, substantially as and for the purpose specified.

31. In a machine for inserting metallic fastenings into work, a work-feeding mechanism consisting of a feed-bar provided with teeth or projections to engage the work, a lever to which said feed-bar is secured, a cam to operate said lever and move it in one direction, and means to act on said lever to move it in the opposite direction, and an adjustable stop to limit the movement of the lever in the direction to effect the feed of the work, substantially as described.

32. In a machine for inserting metallic fastenings into work, the combination of the following instrumentalities, viz: a stationary head, an elbow-lever pivoted thereto and provided with a beveled or inclined surface, a horn or work-support movable longitudinally in opposite directions, means to move it in one direction, and means to move it in an opposite direction, consisting of a pivoted lever provided with a segmental surface and to which the horn is connected, an inclined surface or back-stop attached to the said pivoted lever and coöperating with the inclined surface on the elbow-lever to limit the movement of the said elbow-lever in one direction, a cam-operated lever movable independently of the lever carrying the segmental surface, means carried by the said cam-actuated lever and coöperating with the said segmental surface to effect a connection between the said cam-actuated lever and the segmental surface, and a controlling device to regulate said connection and thereby the extent of movement of said horn, substantially as described.

In testimony whereof I have signed my name to this specification in the presence of two subscribing witnesses.

LOUIS H. GODDU.

Witnesses:
JAS. F. CHURCHILL,
J. MURPHY.